(12) United States Patent
Bjorstrom et al.

(10) Patent No.: US 11,503,211 B2
(45) Date of Patent: Nov. 15, 2022

(54) STABILIZATION SUSPENSIONS AND METHODS OF MANUFACTURE

(71) Applicant: Hutchinson Technology Incorporated, Hutchinson, MN (US)

(72) Inventors: Jacob D. Bjorstrom, Hutchinson, MN (US); Mark A. Miller, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 16/932,624

(22) Filed: Jul. 17, 2020

(65) Prior Publication Data

US 2021/0051258 A1  Feb. 18, 2021

Related U.S. Application Data

(60) Provisional application No. 62/888,324, filed on Aug. 16, 2019.

(51) Int. Cl.
*H04N 5/228* (2006.01)
*H04N 5/232* (2006.01)
*H04N 5/225* (2006.01)
*F16M 13/02* (2006.01)
*G02B 27/64* (2006.01)
*G03B 3/10* (2021.01)

(52) U.S. Cl.
CPC .......... *H04N 5/2328* (2013.01); *F16M 13/02* (2013.01); *G02B 27/64* (2013.01); *H04N 5/2257* (2013.01); *F16M 2200/065* (2013.01); *G03B 3/10* (2013.01)

(58) Field of Classification Search
CPC .... H04N 5/2328; H04N 5/2257; F16M 13/02; F16M 2200/065; G02B 27/64; G03B 3/10
USPC .............. 359/811, 819, 822, 823; 348/208.7
See application file for complete search history.

(56) References Cited

U.S. PATENT DOCUMENTS

| | | | |
|---|---|---|---|
| 9,324,526 B2* | 4/2016 | Wilson | H01F 7/0221 |
| 2016/0154251 A1* | 6/2016 | Ladwig | G02B 27/646 |
| | | | 359/557 |
| 2016/0154252 A1* | 6/2016 | Miller | G02B 7/02 |
| | | | 359/557 |
| 2016/0259177 A1 | 9/2016 | Ladwig et al. | |
| 2017/0336646 A1* | 11/2017 | Miller | H04N 5/2254 |
| 2018/0191957 A1 | 7/2018 | Miller et al. | |
| 2021/0168289 A1* | 6/2021 | Hubert | G03B 13/36 |

FOREIGN PATENT DOCUMENTS

WO  2017/156462 A2  9/2017

OTHER PUBLICATIONS

Examination Report in United Kingdom Application No. 2011964.0, dated Nov. 16, 2021.
Examination Report in United Kingdom Application No. 2011964.0, dated Jun. 13, 2022.

\* cited by examiner

*Primary Examiner* — William Choi
(74) *Attorney, Agent, or Firm* — DLA Piper LLP (US)

(57) ABSTRACT

A suspension assembly is described. A suspension assembly including a support member configured to receive at least a first circuit member. The first circuit member including at least a trace. The first circuit member disposed on the support member.

17 Claims, 19 Drawing Sheets

STABILIZATION SUSPENSIONS AND METHODS OF MANUFACTURE

CROSS-REFERENCE TO RELATED APPLICATIONS

This application claims the benefit of U.S. Provisional Application No. 62/888,324 filed on Aug. 16, 2019, which is hereby incorporated by reference in its entirety.

FIELD

The invention relates generally to stabilization suspensions used in connection with cameras, including those incorporated into mobile devices such as phones and tablets.

BACKGROUND

Various suspension assemblies use shape memory alloy ("SMA") wires to couple a support member of a suspension assembly to a moving member of the suspension assembly. Suspension assemblies of these types can be included in cameras as part of a camera lens element, which can optionally include an auto-focusing drive. The systems may be enclosed by a structure such as a screening can. Such suspension assemblies can be actuated by applying electrical drive signals to the SMA wires.

There remains a continuing need for improved lens suspensions. In particular, there is a need for such suspension structures with improved structures for coupling electrical signals on the suspensions that do not damage the SMA wires and/or are less susceptible to the SMA wires being damaged when the suspensions are in use. Suspension structures of these types that are highly functional, robust and efficient to manufacture would be particularly desirable.

SUMMARY

A suspension assembly is described. A suspension assembly is described. A suspension assembly including a support member configured to receive at least a first circuit member. The first circuit member including at least a trace. The first circuit member disposed on the support member.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments include optical image stabilization ("OIS") suspensions having a support member, a moving member, and one or more shape memory alloy ("SMA") elements or wires extending between the support member and the moving member. Lens components such as a lens holder and optionally an auto focus (AF) assembly are fixedly mounted to or with respect to the static plate. The SMA wires can be driven by a controller to move the moving plate and image sensor thereon about x-y axes with respect to the static plate and lens components, and stabilize the position of the lens components and the image produced thereby on the sensor. The OIS suspension can thereby compensate for vibrations such as those that might be caused by movement of the user's hands. Suspensions of these types can be miniaturized, and used, for example, with camera lens and imaging systems incorporated into mobile phones, tablets and other devices.

Figure 1:
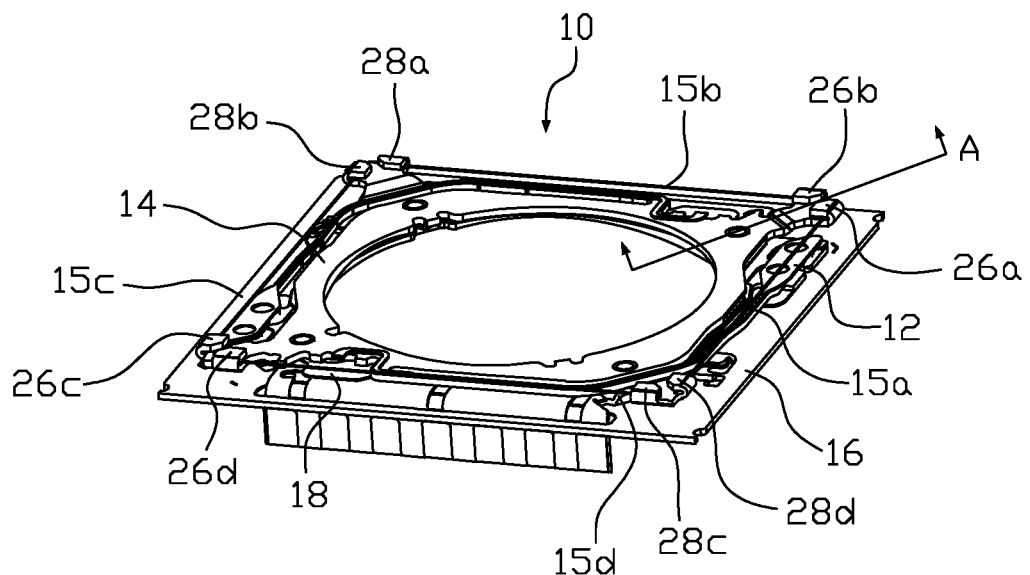
FIG. 1 illustrates a suspension assembly that includes a support member and a moving member 14 according to an embodiment.

FIG. 1 illustrates a suspension assembly 10 that includes a flexible printed circuit ("FPC") or support member 12 and a spring crimp circuit or moving member 14 that is coupled to the support member 12. The support member 12 is disposed over an optional base 16. Shape memory alloy ("SMA") wires 15a-d extend between the support member 12 and the moving member 14, and can be electrically actuated to move and control the position of the moving member with respect to the support member 12. Each of the SMA wires 15a-d are attached to the support member 12 using support member crimps 28a-d and to the moving member using moving member crimps 26a-d. According to other embodiments, the crimps or other SMA wire attach structures are organized in other arrangements, such as a single wire attach structures rather than in pairs. The suspension assembly 10 also includes a shim style bearing limiter 18. The bearing limiter is configured to minimize the amount of bearing compression so that the bearing does not become permanently deformed. The shim style bearing limiter 18 is configured to sit between the support member 12 and the moving member 14. According to various embodiments, a lens can be mounted to the moving member 14. According to other embodiments, an autofocus system supporting the lens can be mounted to the moving member 14. According to various embodiments, the suspension assembly 10 is a camera lens optical image stabilization ("OIS") device that can be incorporated, for example, into mobile phones, tablets, laptop computers and other electronic devices.

Figure 2:
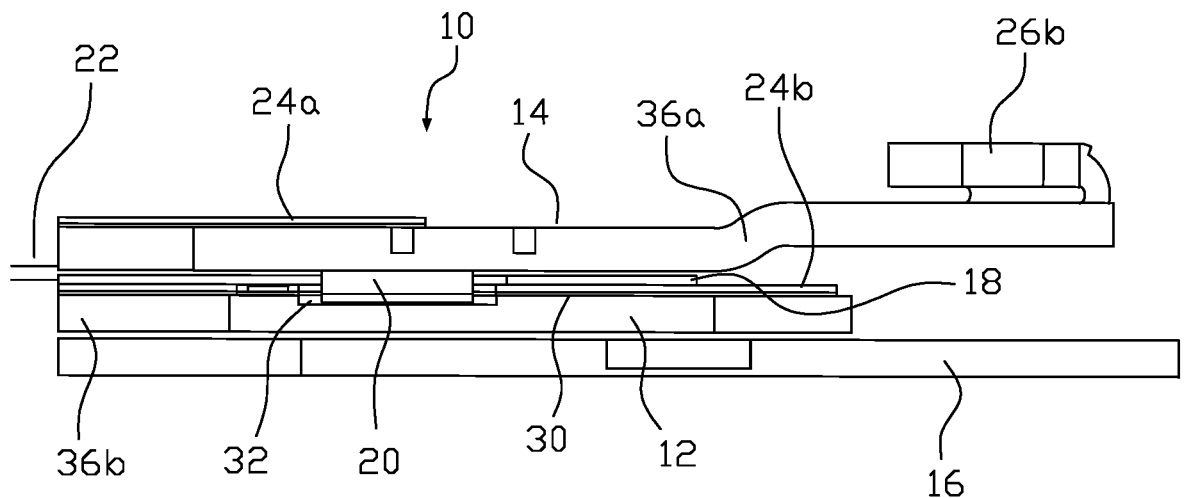
FIG. 2 illustrates a cross-section of the suspension assembly as illustrated in FIG. 1 taken along line A.

FIG. 2 illustrates a cross-section of the suspension assembly as illustrated in FIG. 1 taken along line A. The shim style bearing limiter 18 is positioned between the moving member 14 and the support member 12. The shim style bearing limiter 18 is configured to minimize the amount a bearing 20 can be compressed by the moving member 14 before the moving member 14 hits the shim style bearing 18. The height of the bearing 20 defines a bearing distance about a z-axis of the suspension assembly. For some embodiments, a gap 22 (also referred to herein as gap distance) can exist between the moving member 14 and the shim style bearing limiter 18. The gap 22 can enable the moving member 14 to move in the direction of the longitudinal axis, for example in the direction of an x axis and y axis, of the moving member 14. For various embodiments, the gap 22 is configured to be no more than 20 percent of the original height of a bearing 20. For some embodiments, the gap 22 can be in a range including 20-25 microns. The thickness of the shim style bearing limiter 18, according to some embodiments, is configured to allow a bearing 20 to protrude over the shim style bearing limiter by a height in a range of approximately 10-35 microns above the shim style bearing limiter 18 when disposed on the support member 12.

The support member 12, for some embodiments, includes a dielectric layer 24 disposed over at least a portion of the support member 12. The dielectric layer 24b can be a cover coat disposed over a conductive layer 30. For various embodiments, the dielectric layer 24 is a polyimide layer. The conductive layer 30 includes one or more traces and is disposed over the support member 12. The support member 12, according to some embodiments, includes a partial etch pocket 32. The partial etch pocket 32 is configured to a location on a support member 12 for the bearing 20. The depth of the partial etch pocket 32 can be adjusted to provide a desired gap 22 while reducing the thickness of a bearing limiter, such as a shim style bearing limiter 18. In some cases, adjusting the depth of the partial etch pocket 32 can be more cost effective and/or convenient than increasing or decreasing material thickness of a bearing limiter. Other embodiments include a support member without a partial etch pocket 32 formed in the support member 12. Such embodiments may include a thicker shim style bearing limiter 18 instead.

Both the base member 12 and the moving member 14 are integrated lead structures according to the some embodiments, in that they have electrical structures such as leads, contact pads and terminals (e.g., in a copper "Cu" or copper alloy layer) formed on a metal base layer 36a,b (e.g. stainless steel (SST)). The dielectric layers 24a,b separates the portions of the electrical structures that are to be electrically isolated from the metal base layers 36a,b (for various embodiments, other portions of the Cu layer are connected to or directly on a metal base layer 36a,b).

Figure 3:
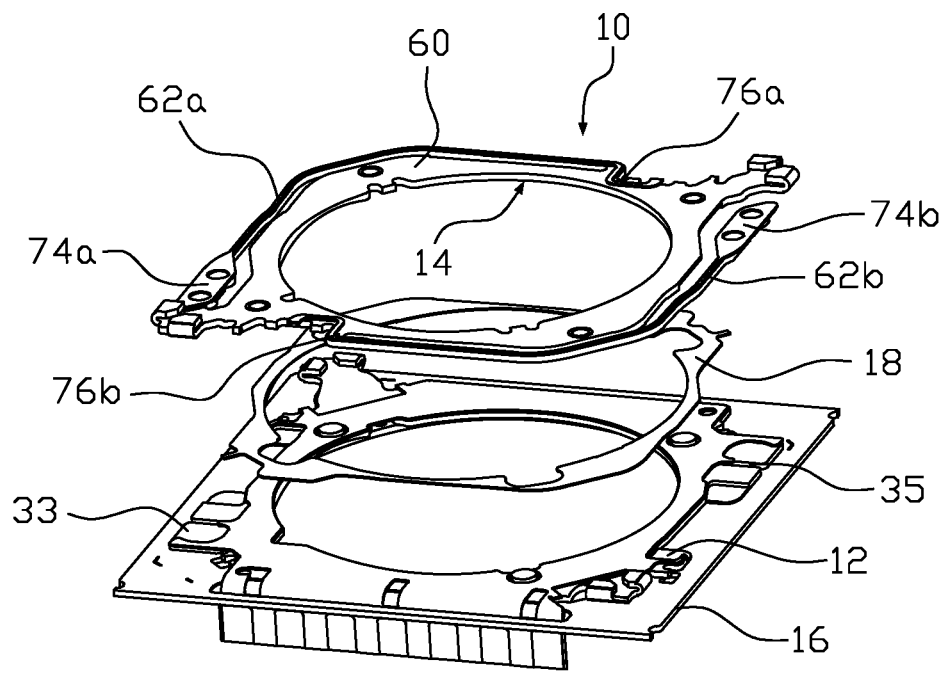
FIG. 3 illustrates an exploded view of the suspension assembly illustrated in FIG. 1.

FIG. 3 illustrates an exploded view of the suspension assembly illustrated in FIG. 1. The shim style bearing limiter 18 is between the support member 12 and the moving member 14. As shown, the moving member 14 includes a plate 60 and spring or flexure arms 62a,b extending from the plate 60. The plate 60, for some embodiments, includes a sensor mounting region configured to receive an image sensor. According to various embodiments, the plate 60 and flexure arms 62a,b are formed in a spring metal base layer such as stainless steel. Moving member 14 is configured differently in other embodiments. For example, in other embodiments, the flexure arms 62a,b can be shaped differently, be different in number, organized differently, and/or can extend from other locations on the plate 60.

The end portions of the flexure arms 62a,b have mount regions 74a,b that are configured to be mounted to the mount regions 33 and 35 of the support member 12. Conductive traces 76a,b on the base layer 36a of the moving member 14 extend on the flexure arms 62a,b. According to various embodiments, the traces 76a,b also extend on the base layer 36a over portions of the plate 60. According to the illustrated embodiment, the traces 76a,b on the arms 72 also extend to contact pads on the plate 60. A layer of dielectric is located between the conductive traces 76s,b and the base layer 36a,b to electrically insulate the traces 76a,b from the base layer 36a,b.

The mount regions 74a,b of the moving member flexure arms 62a,b are mechanically attached to the mount regions 33 and 35 respectively of the support member 12. The traces 76a,b on the flexure arms 62a,b are electrically connected to the associated traces on the support member 12. According to various embodiments, the mechanical connections are made by welds. The welds also enable electrical connections between the moving member 14 and the support member 12 that can be used to actuate the moving member 14 using SMA wires 15a-c. Other embodiments have other structures for mechanically mounting the flexure arms 62a,b to the support member 12, and/or for electrically connecting the traces 76a,b on the flexure arms to the associated traces on the support member 12.

The support member 12 and moving member 14 can be formed from additive and/or subtractive processes using techniques including those known in the art. Base layers 36a,b are stainless steel according to various embodiments. For other embodiments the base layers 36a,b are other metals or materials such as phosphor-bronze. Electrical structures, including, but not limited to, traces, terminals, and contact pads can be formed from copper, copper alloys or other conductive materials. Polyimide or other insulating materials can be used as a dielectric.

Figure 4:
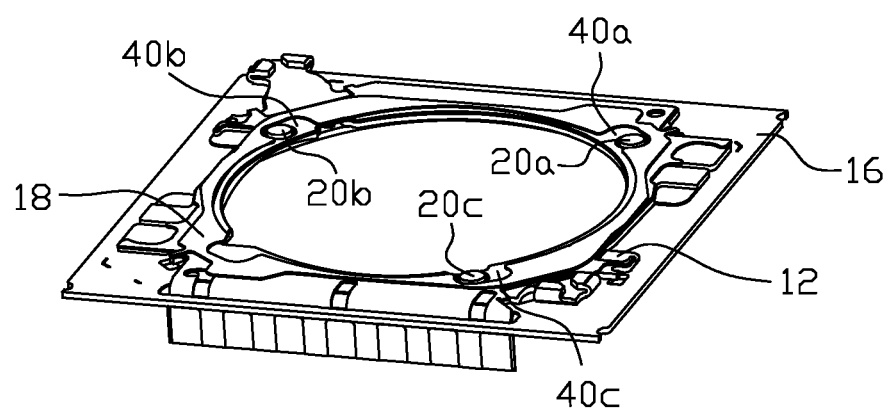
FIG. 4 illustrates a moving member of a suspension assembly including a shim style bearing limiter as illustrated in FIG. 1.

FIG. 4 illustrates a moving member of a suspension assembly including a shim style bearing limiter as illustrated in FIG. 1. The shim style bearing limiter 18 is disposed on the support member 12, which is disposed on base 16. The shim style bearing limiter 18 forms voids 40a-d. The voids 40a-d are formed so that bearings 20a-c are within the voids 40a-d. As illustrated, the support member 12, according to some embodiments, also includes three bearings 20a-c formed as slide bearings. However, any number of bearings 20a-c may be used. The bearings 20a-c formed as slide bearings can be made from or include a low friction material to enable relative sliding between the moving member 14 and the support member 12. For some embodiments, the bearings 20a-c are ball bearings with features formed on support member 12 to contain the ball bearings. The shim style bearing limiter 18, according to various embodiments, is configured to not be too high and rub on the moving member 14. Other embodiments, include a shim style bearing limiter that is formed of separate sections instead of a unitary form. Each shim style bearing limiter section is configured to mount on the support member 12 adjacent to each of the one or more bearings 20a-c.

Figure 5:
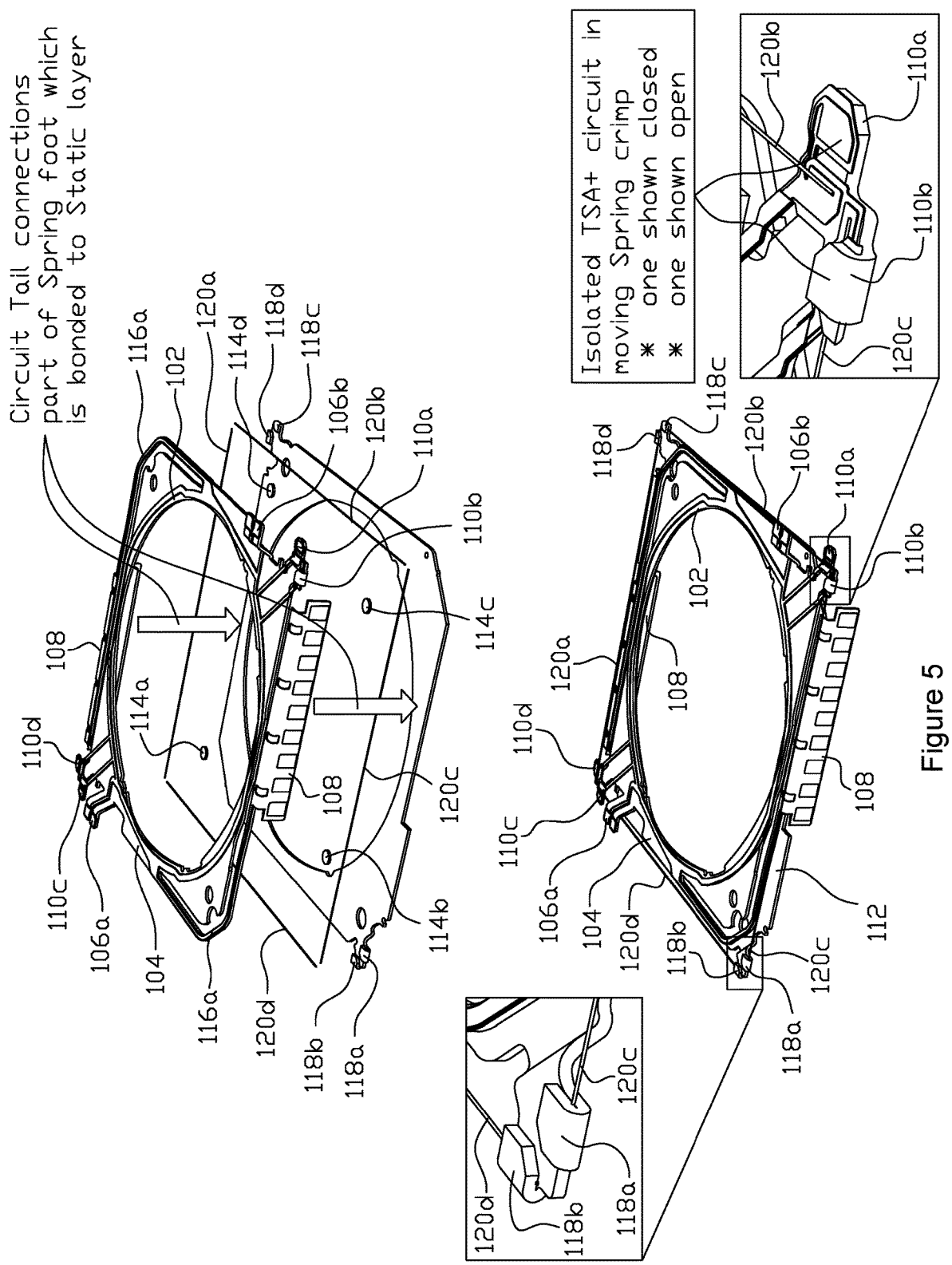
FIG. 5 illustrates a suspension assembly according to an embodiment including an O-shaped single circuit.

FIG. 5 illustrates a suspension assembly according to an embodiment. The suspension assembly includes an O-shaped single circuit 102 formed using techniques including those described herein. Thus, all traces and conductive features needed for the circuit are formed on one member of the suspension assembly, such as the moving member 104. This reduces the number of steps in the manufacturing process, which reduces cost and reduces the manufacturing time.

The O-shaped single circuit 102 electrically couples electrical structures on the moving member 104. For some embodiments, the moving member 104 includes electrical structures including, but not limited to, contact pads for autofocus circuit connections 106 and circuit tail connections 108. Circuit tail connections 108, according to some embodiments, are configured to connect an optical image stabilizer circuits and autofocus circuits to a circuit board or other circuits external to the suspension assembly. The circuit tail connections 108 are connected to a respective flexure arm 116, such as those described herein, of the moving member 104 using techniques including those described herein. The circuit tail connections 108 are configured to be fixed to a support member 112 using techniques, including, but not limited to, a weld, adhesive, and, solder. The flexible arms 118 include one or more traces on each flexible arm 118. The one or more trace is electronically coupled to the O-shaped single circuit 102. The moving member 104 includes SMA wire attach structures, such as those described herein, configured as crimps 110 are electrically coupled to the O-shaped single circuit 102, according some embodiments.

The suspension assembly also includes a support member 112. The support member 112 is configured to receive the moving member 104. The support member 112 includes one or more bearings 114, such as those describe herein, configured to be disposed between the moving member 104 and the support member 112. The support member 112 includes SMA wire attach structures, such as those described herein, configured as crimps 118. The support member crimps 118, according to some embodiments, are configured to be electrically coupled with a common voltage or a ground voltage. Each SMA wire 120 is attached to a support member 112 by a support member crimp 110 at a first end of each SMA wire 120 and to the moving member by a moving member crimp 118 at a second end of each SMA wire 120, using techniques including those described herein. For some embodiments, the support member crimp 110 and the moving member crimps are gold plated.

Figure 6:
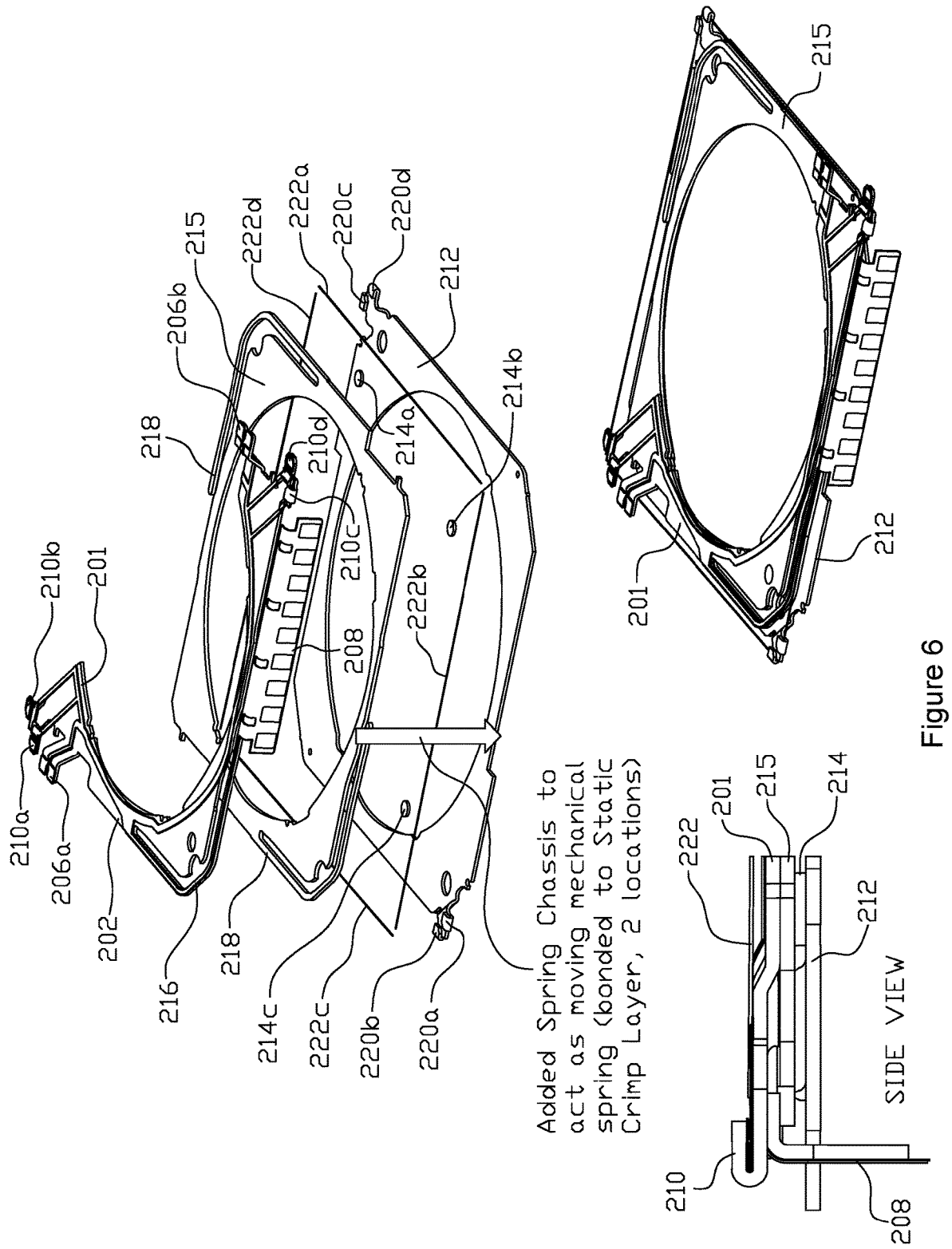
FIG. 6 illustrates a suspension assembly according to an embodiment including an L-shaped single circuit.

FIG. 6 illustrates a suspension assembly according to an embodiment. The suspension assembly includes an L-shaped single circuit 201 formed using techniques including those described herein. Thus, all traces and conductive features for the circuit are formed on a portion of a member of the suspension assembly. Alternatively, all the traces are formed on one member of the suspension assembly, such as the moving member. This reduces the number of steps in the manufacturing process, which reduces cost and reduces the manufacturing time. According to various embodiments, all traces and conductive features are formed on a circuit member 202 of the suspension assembly separate from the moving member 204 and the static/support member 212. According to some embodiments, the circuit member 202 is formed to relatively resemble an L-shape. However, the circuit member 202 may be formed in other shapes. These other shapes, such as an L-shaped circuit member, reduce the area needed to form the circuit member 202 when to compared to an O-shaped circuit member. This reduces the cost of manufacturing because the smaller areas provide a higher density of components to be manufactured at a time.

The L-shaped single circuit 201 electrically couples electrical structures on the circuit member 202. For some embodiments, the circuit member 202 includes electrical structures including, but not limited to, contact pads for autofocus circuit connections 206 and a circuit tail connection 208, such as those described herein. The circuit tail connection 208 are connected to a respective flexure arm 216, such as those described herein, using techniques including those described herein. The circuit tail connection 208 is configured to be fixed to a support member 212 using techniques including those described herein. The flexible arm 216 includes one or more traces on the flexible arm 216. The one or more trace is electronically coupled to the L-shaped single circuit 201. The circuit member 202 includes SMA wire attach structures, such as those described herein, configured as crimps 210 electrically coupled to the L-shaped single circuit 201, according some embodiments.

The suspension assembly includes a spring chassis 215. According to some embodiments the spring chassis 215. The circuit member 202 is disposed on the static chassis 215. The circuit member 202, for some embodiments, is fixed to the spring chassis 215 using one or more of any of a weld, solder, adhesive, and other joining techniques. The spring chassis 215 includes flexible arm members 218 that are configured as a moving mechanical spring. The flexible arm members 218, according to some embodiments, are formed integrally with the spring chassis 215, using techniques including those described herein. The flexible arm members 218 are fixed to a support member 212 at an end portion of the flexible arm members 218.

The support member 212 is configured to receive the moving member 204 with the circuit member 202. The support member 212 includes one or more bearings 214, such as those describe herein, configured to be disposed between the moving member 204 and the support member 212. The support member 212 includes SMA wire attach structures, such as those described herein, configured as crimps 220. The support member crimps 220, according to some embodiments, are configured to be electrically coupled with a common voltage or a ground voltage. Each SMA wire 222 is attached to a support member 212 by a support member crimp 220 at a first end of each SMA wire 222 and to the L-shaped single circuit 201 by the circuit crimp 210 at a second end of each SMA wire 222, using techniques including those described herein. For some embodiments, the support member crimps 220 and the circuit crimps 210 are gold plated.

Figure 7:
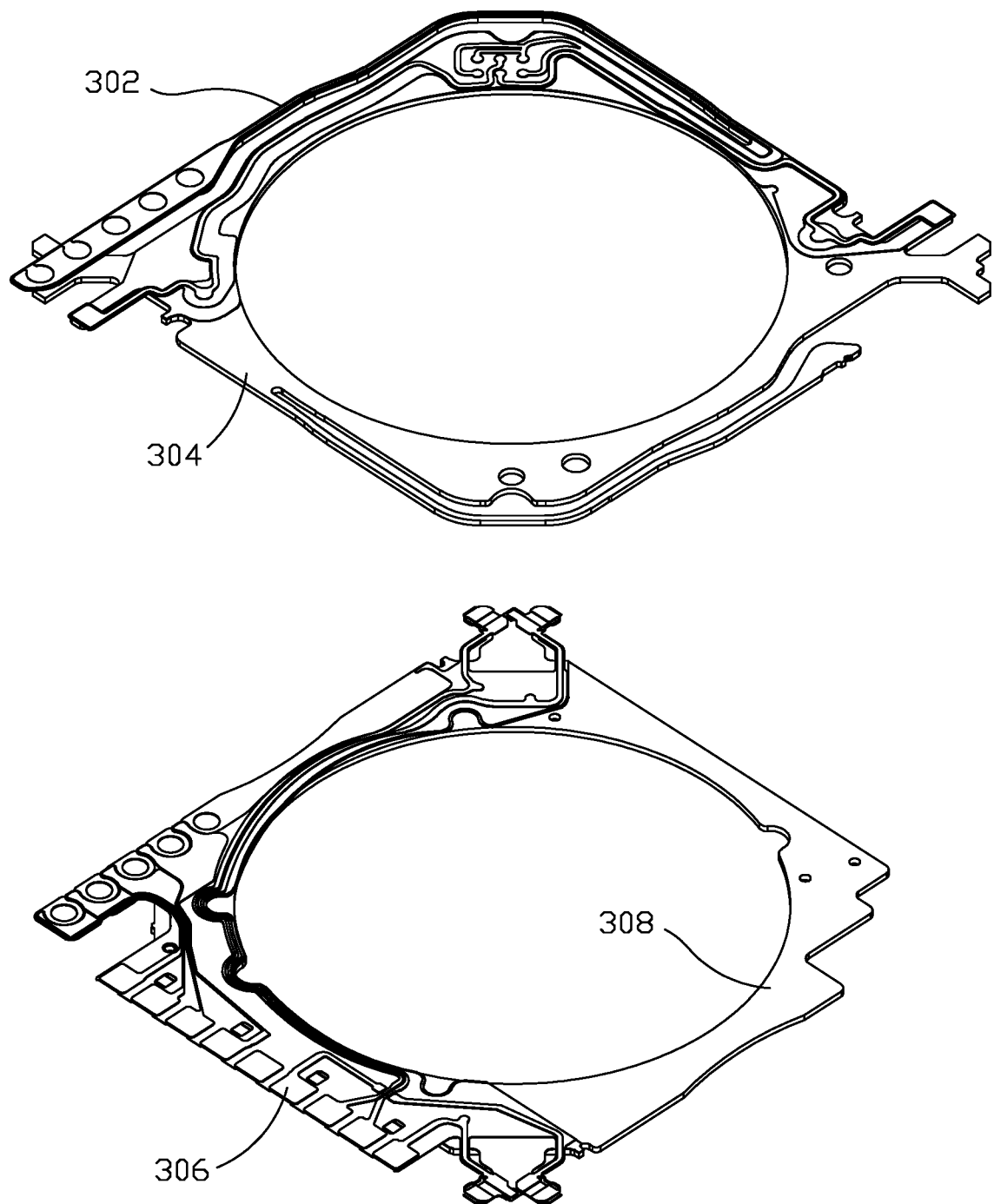
FIG. 7 illustrates a suspension assembly including two trace members according to an embodiment.
Figure 8:
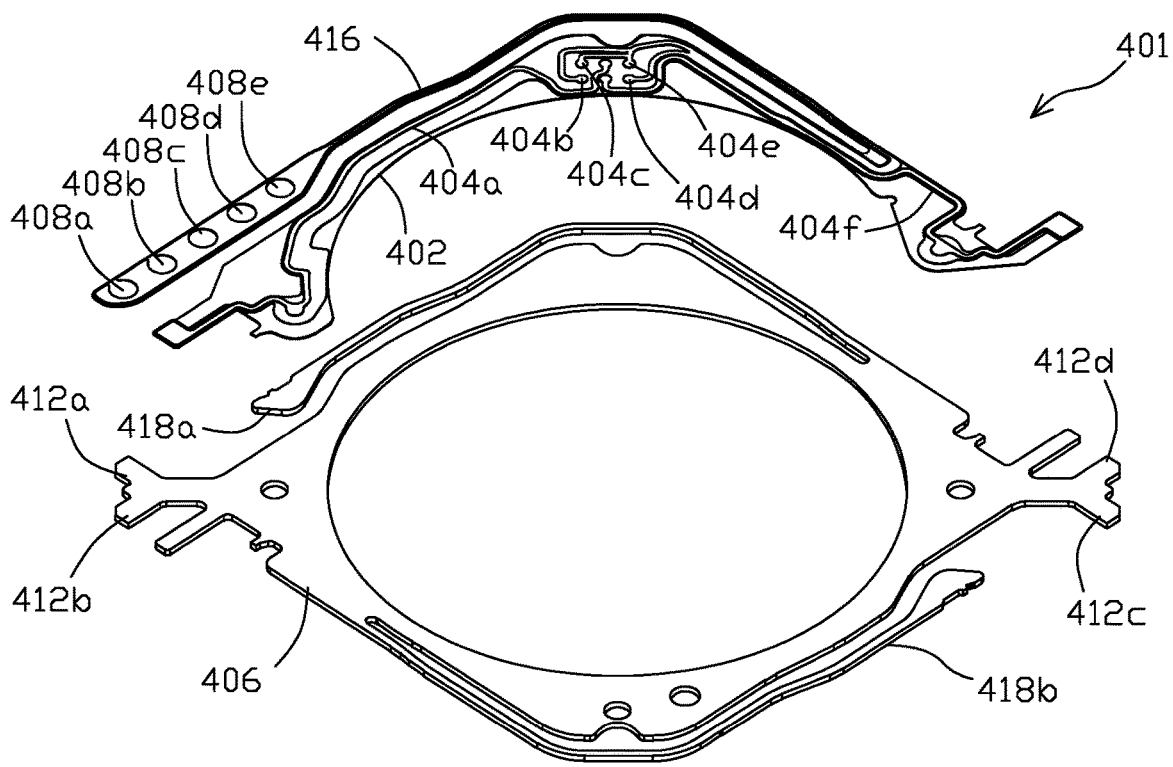
FIG. 8 illustrates an exploded view of a moving member 401 including a circuit member according to various embodiments.

FIG. 7 illustrates a suspension assembly including two trace members according to an embodiment. A first circuit member 302 is disposed on a moving member 304 and a second circuit member 306 is disposed on a static member 308. FIG. 8 illustrates an exploded view of a moving member 401 including a circuit member 402 according to various embodiments described herein. The circuit member 402, formed using techniques including those described herein, includes multiple traces 404 and conductive features, including those described herein. The circuit member 402 is configured to be disposed on a portion of a moving member chassis 406. The circuit member 402 includes a flexure arm 416 formed integrally with the circuit member 402. The flexure arm 416 includes a plurality of traces 404b-d disposed and a plurality of conductive features, such as contact pads 408, thereon.

The circuit member 402 includes all the traces and conductive features for the moving member 401 and is configured to be disposed on a portion of the moving member chassis 406, according to some embodiments. According to some embodiments, the circuit member 402 is fixed to the moving chassis using one or more of any of a weld, solder, adhesive, and other joining techniques. The moving member chassis 406 includes one or more flexible arm members 418. The flexible arm members 418, according to some embodiments, are formed integrally with the moving member chassis 406, using techniques including those described herein. The moving member chassis 406 includes SMA wire attach structures 412, such as those described herein, configured to attach SMA wires using techniques including those described herein. For some embodiments, the circuit member is formed to have a thickness less than the moving member.

Figure 9:
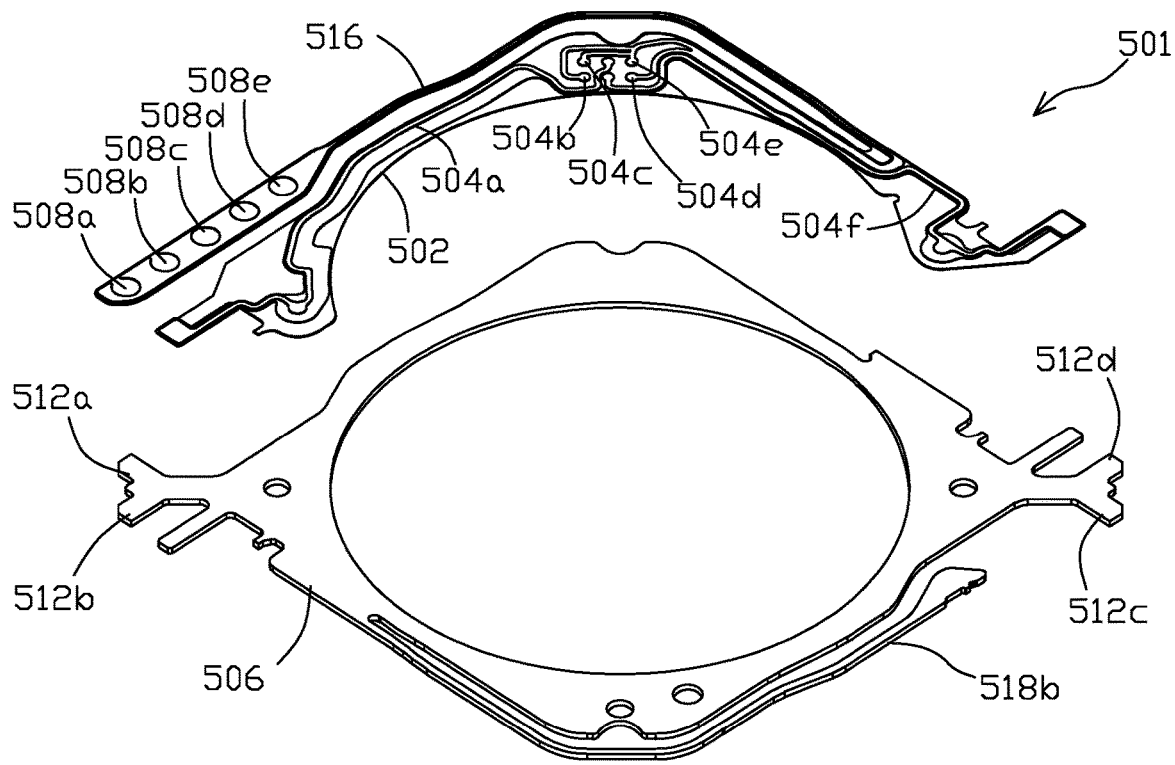
FIG. 9 illustrates an exploded view of a moving member including a circuit member according to various embodiments.

FIG. 9 illustrates an exploded view of a moving member 501 including a circuit member 502 according to various embodiments described herein. The circuit member 502, formed using techniques including those described herein, includes multiple traces 504 and conductive features, including those described herein. The circuit member 502 is configured to be disposed on a portion of a moving member chassis 506. The circuit member 502 includes a flexure arm 516, such as those described herein, formed integrally with the circuit member 502. The circuit member 502 including the flexure arm 516, according to some embodiments, is for use with a moving member chassis 506 including a single flexure arm 518 formed integrally with the moving member chassis 506. The circuit member 502 including the flexure arm 516 includes a plurality of traces 504a-f and a plurality of conductive features, such as contact pads 508, for a moving member and is configured to be disposed on a portion of the moving member chassis 506, according to some embodiments. For some embodiments, the circuit member 502 is formed to have the same or a similar thickness as the moving member chassis 506.

The circuit member 502 includes all the traces 504a-f and conductive features for the moving member 501 and is configured to be disposed on a portion of the moving member chassis 506, according to some embodiments. According to some embodiments, the circuit member 502 is fixed to the moving chassis using one or more of any of a weld, solder, adhesive, and other joining techniques. The moving member chassis 506 includes SMA wire attach structures 512, such as those described herein, configured to attach SMA wires using techniques including those described herein. For some embodiments, the circuit member 502 is formed to have a thickness less than the moving member chassis 506.

Figure 10:
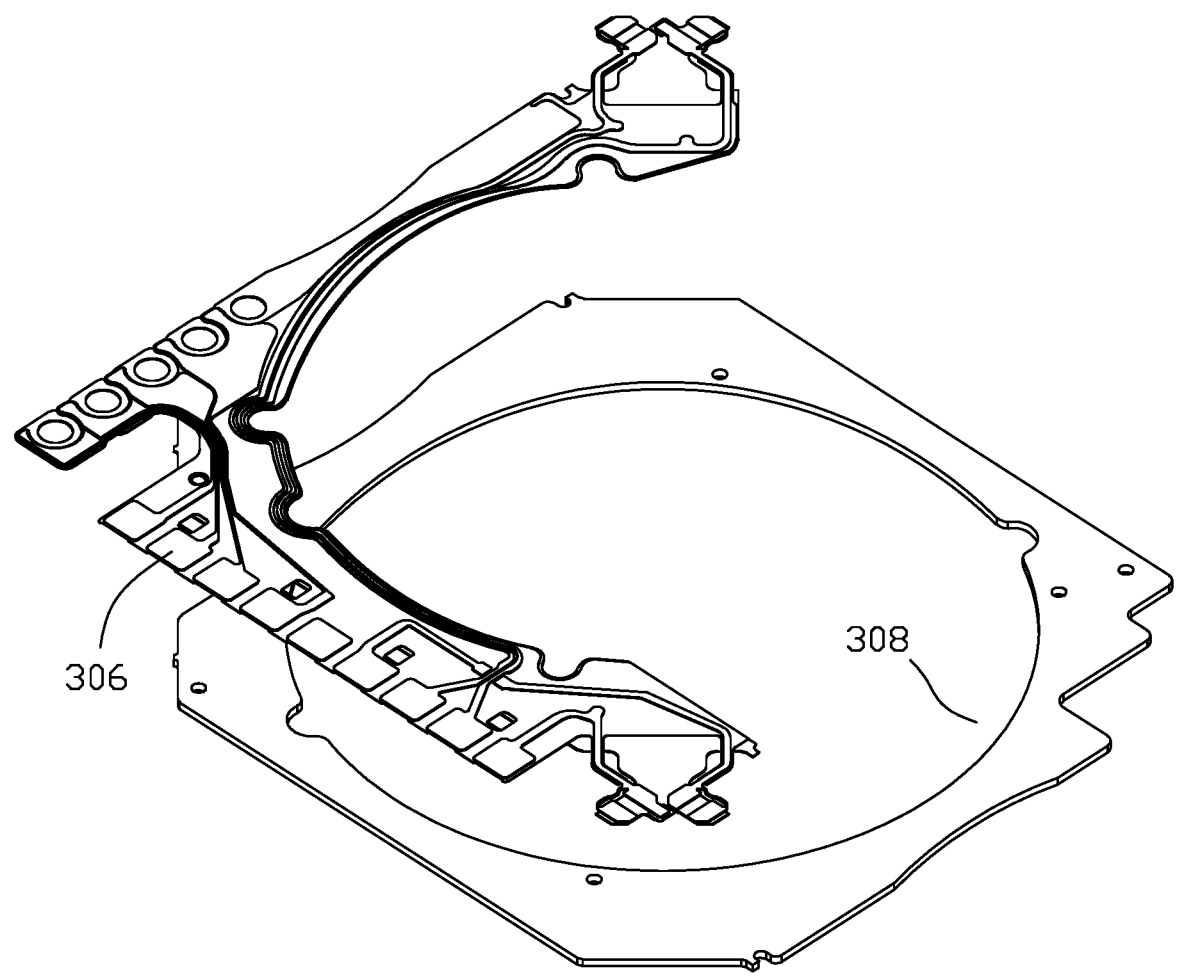
FIG. 10 illustrates an exploded view of a static member including a circuit member 306 according to various embodiments.

FIG. 10 illustrates an exploded view of a static member including a circuit member 306 according to various embodiments describe herein. The circuit member 306 includes all the traces and conductive features for a static member 308 and is configured to be disposed on a at least a portion of the static member 308.

Figure 11:
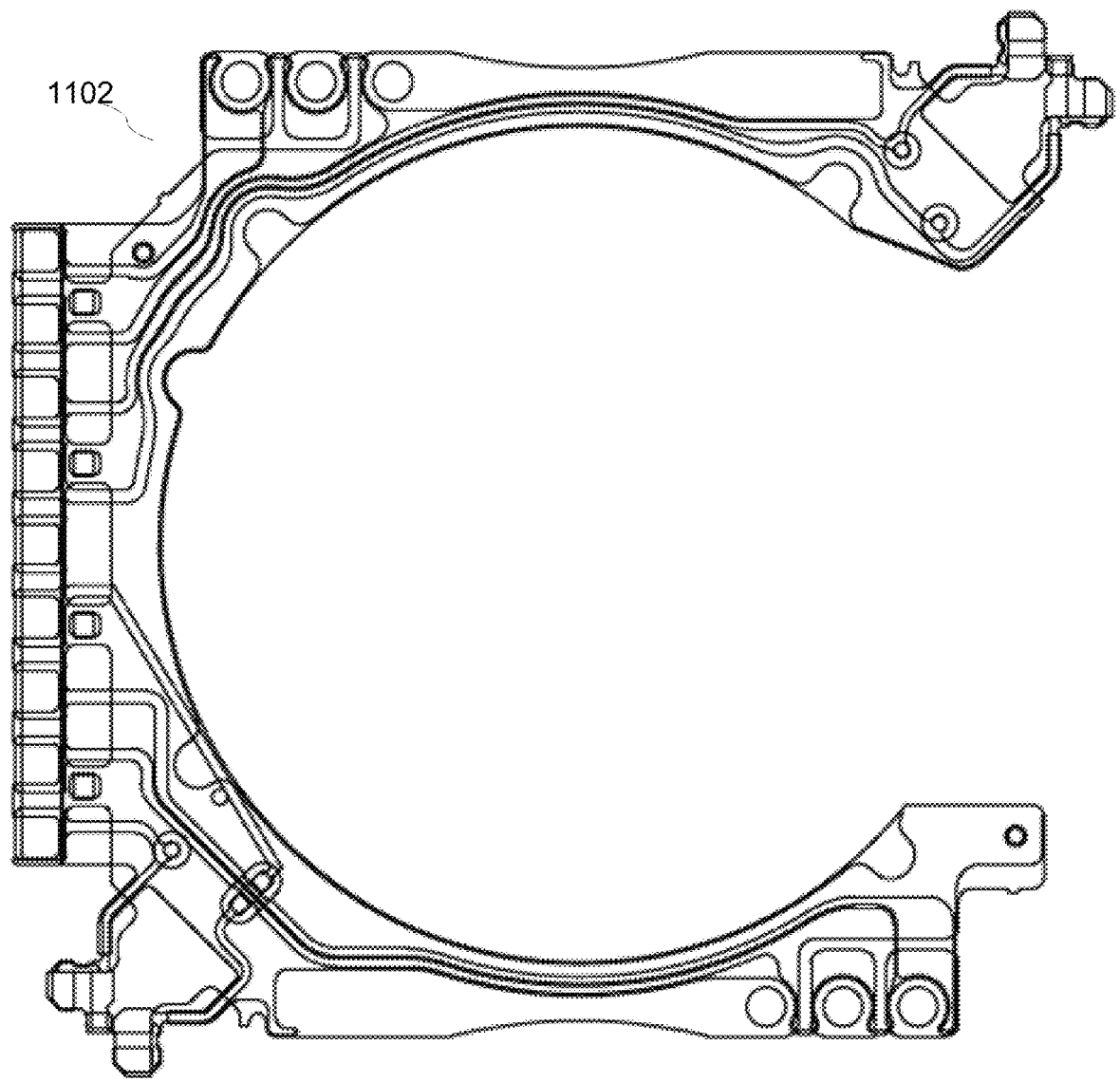
FIG. 11 illustrates a circuit member in a shape relatively resembling a C-shape according to an embodiment.
Figure 12:
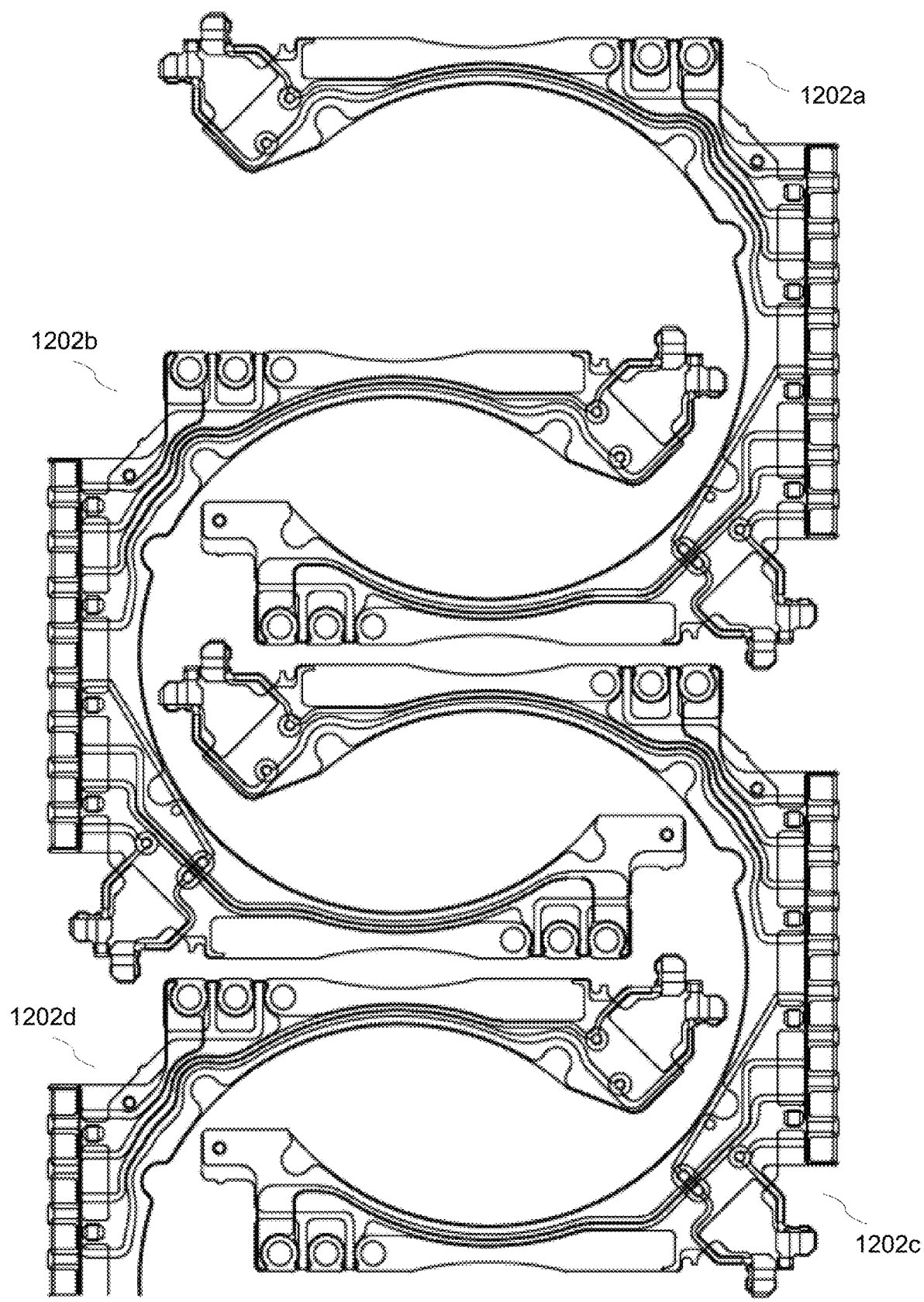
FIG. 12 illustrates an arrangement of circuit members in a shape relatively resembling a C-shape according to an embodiment.

FIG. 11 illustrates a circuit member in a shape relatively resembling a C-shape according to an embodiment. The circuit member 1102 is configured to include all the traces and conductive features, such as those described herein, and configured to be disposed on a moving member or a static member of a suspension assembly, such as those described herein. FIG. 12 illustrates an arrangement of circuit members 1202 in a shape relatively resembling a C-shape according to an embodiment. The shape of the circuit member 1202 provides manufacturing efficiencies to reduce the cost of manufacturing suspension assemblies. For example, the circuit member 1202 is formed in a shape such as the C-shape circuit members that enable nesting of individual parts during the manufacturing process reducing the area needed to manufacture one part. Thus, more circuit members are made per batch.

Figure 13:
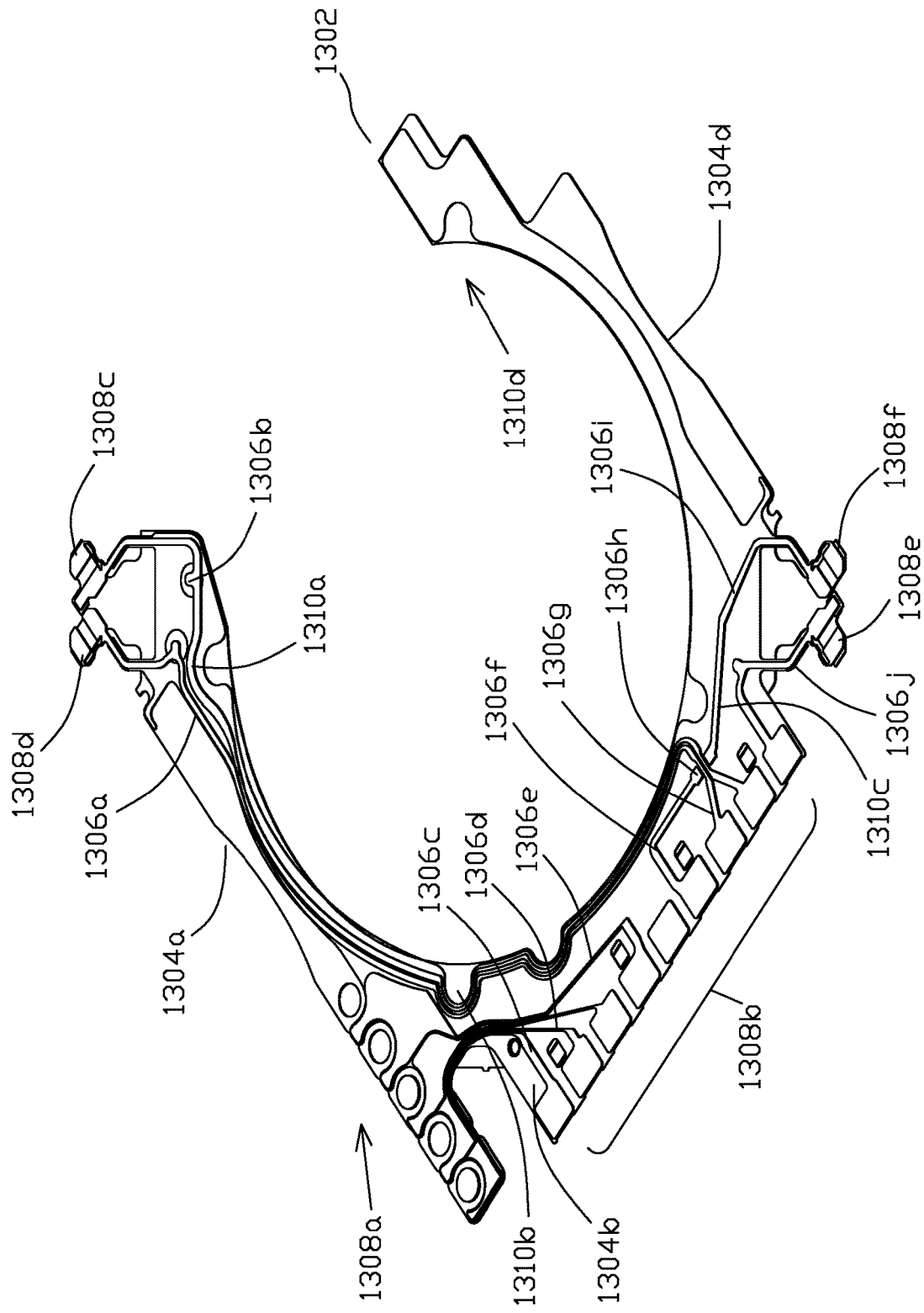
FIG. 13 illustrates a circuit member in a shape relatively resembling a C-shape according to an embodiment.
Figure 14:
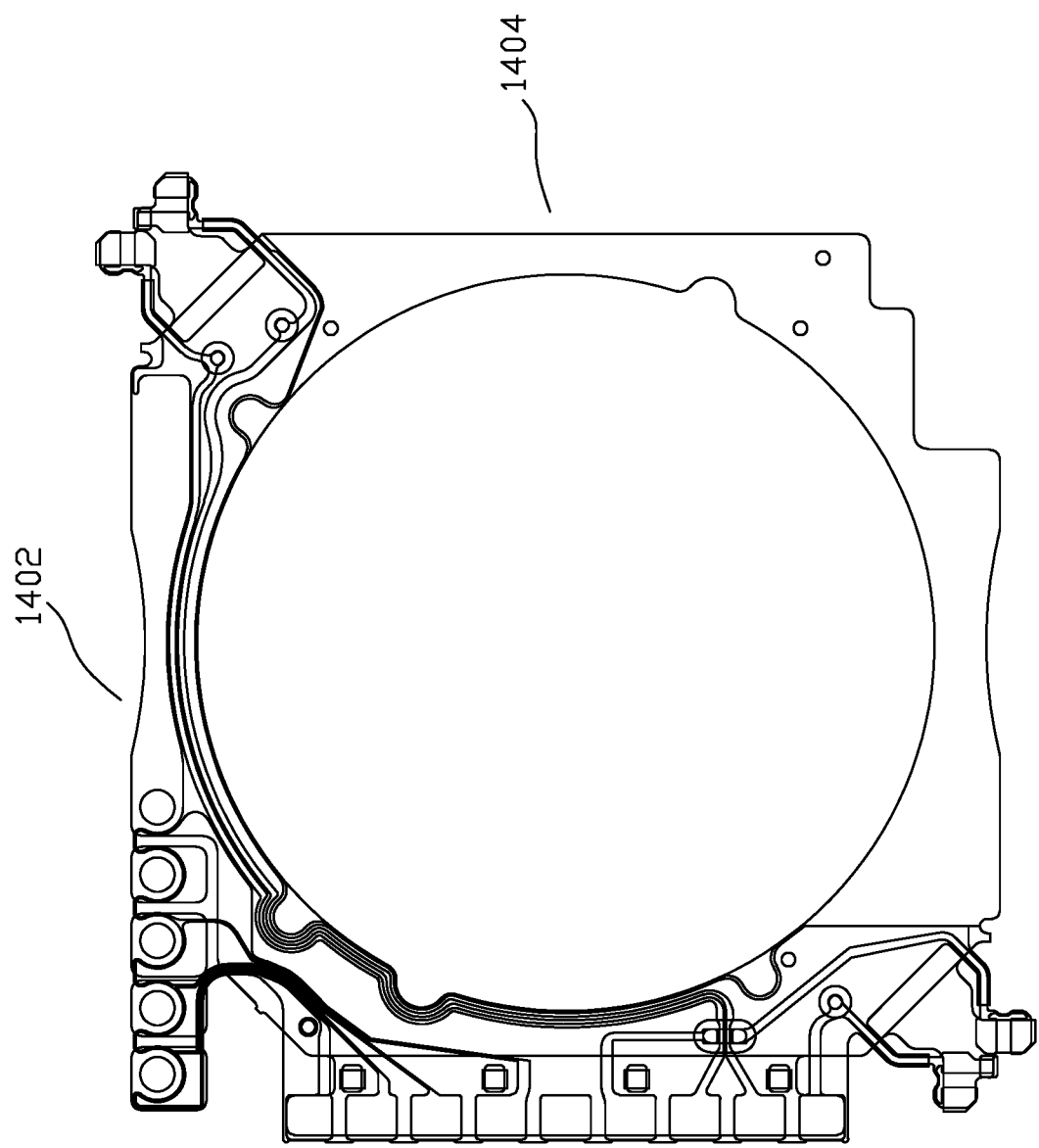
FIG. 14 illustrates a circuit member, according to an embodiment.

FIG. 13 illustrates a circuit member in a shape relatively resembling a C-shape according to an embodiment. The circuit member 1302, according to some embodiments, is configured to have a three sections 1304. In the illustrated embodiment, a first section 1304a includes a plurality of traces 1306 and conductive features 1308, such as those described herein. The conductive features 1308a are contact pads configured to couple with another member of a suspension assembly, such as a circuit member including those described herein. For some embodiments, the contact pads configured to couple with another member of a suspension assembly are disposed on a first section 1304a. A second section 1304b, which is between the first section 1304a and a third section 1304d. The second section 1304b includes traces 1306 and conductive features 1308b. According to some embodiments, the third section 1304d does not include any traces but includes a portion 1310 configured to receive a bearing, such as those described herein. According to some embodiments, the sections 1304 may include none or one or more portions 1310 configured to receive a bearing. FIG. 14 illustrates a circuit member 1402, according to an embodiment, in a shape relatively resembling an L shape disposed on an O-shaped static member 1404. The circuit member 1402 is configured according to embodiments describe herein. The O-shaped static member 1404 is configured according to embodiments described herein. For some embodiments the O-shaped static member 1404 is configured to have a profile for attaching bearings using techniques including those described herein.

Figure 15:
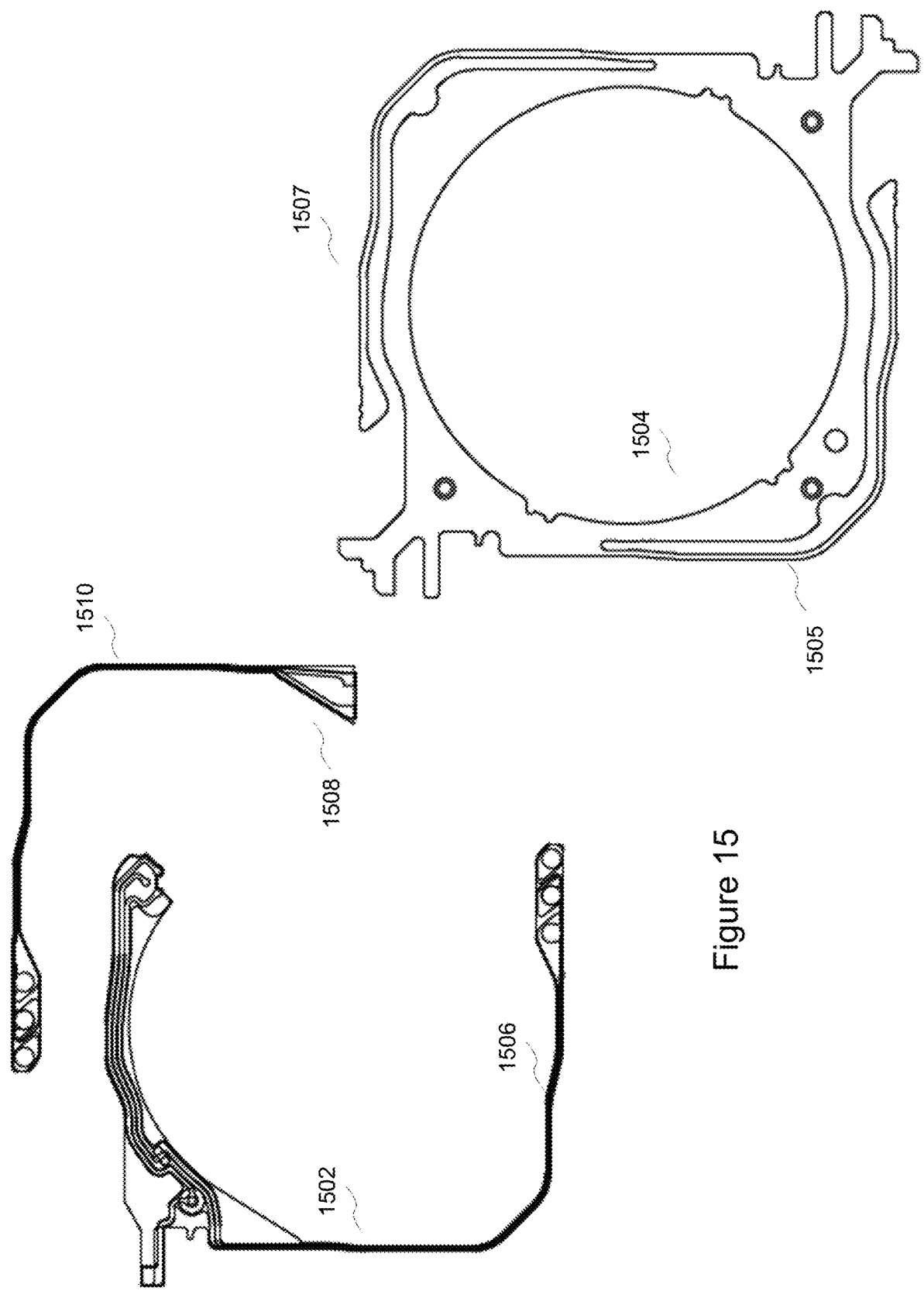
FIG. 15 illustrates circuit members of different shapes, according to embodiments.

FIG. 15 illustrates circuit members of different shapes, according to embodiments, to be disposed together on a moving member chassis. A first circuit member 1502 is configured in a shape that relatively resembles a C-shape and is configured to be disposed on portion of a moving member 1504 including a first flexure arm member 1505. The first circuit member 1502 includes a first flexure arm 1506. The first flexure 1506 is configured to be disposed on the first flexure arm member 1505 using techniques including those described herein. A second circuit member 1508 is configured in a shape that relatively resembles an L-shape. The second circuit member 1508 includes a second flexure arm 1510. The second flexure arm 1510 is configured to be disposed on another portion of a moving member 1504 including a second flexure arm 1507 using techniques including those described herein. The first and second circuit members are configured to include one or more electrical structures including, but not limited to, contact pads and one or more traces, such as those described herein. The separate circuit members enable the components to be manufactured in nested batched which enable manufacturing efficiencies that help reduce the cost of manufacturing and help to increase manufacturing yields.

Figure 16:
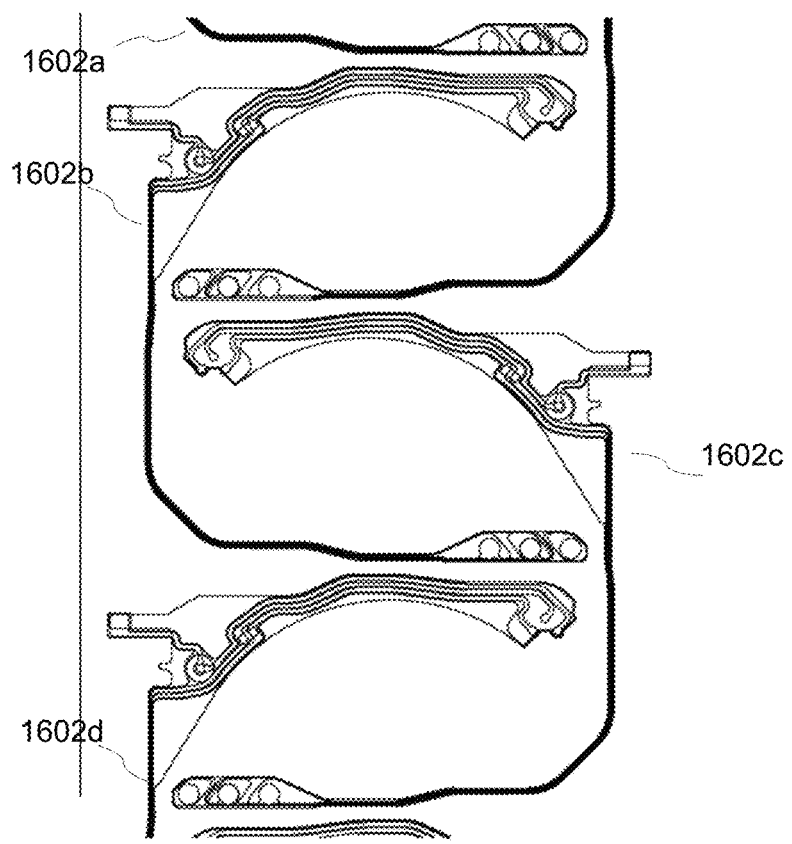
FIG. 16 illustrates an arrangement of circuit members in a shape relatively resembling a C-shape according to an embodiment.

FIG. 16 illustrates an arrangement of circuit members in a shape relatively resembling a C-shape according to an embodiment. The shape of the circuit member, such as those described herein, enables manufacturing efficiencies to reduce the cost of manufacturing suspension assemblies. For example, the circuit member 1602 is formed in a shape such as the C-shape circuit members that enable nesting of individual parts during the manufacturing process reducing the area needed to manufacture one part. Thus, more circuit members 1602 are made per batch.

Figure 17:
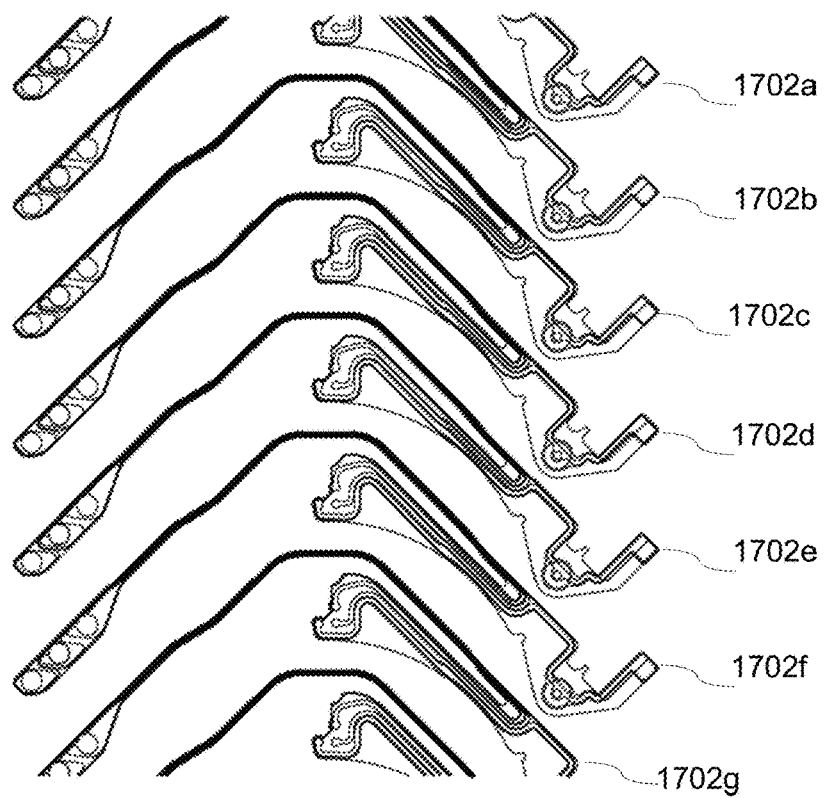
FIG. 17 illustrates an arrangement of circuit members in a shape relatively resembling an L-shape according to an embodiment.

FIG. 17 illustrates an arrangement of circuit members in a shape relatively resembling an L-shape according to an embodiment. The shape of the circuit member, such as those described herein, enables manufacturing efficiencies to reduce the cost of manufacturing suspension assemblies. For example, the circuit member is formed in a shape such as the L-shape circuit members 1702 that enable nesting of individual parts during the manufacturing process reducing the area needed to manufacture one part. Thus, more circuit members are made per batch.

Figure 18:
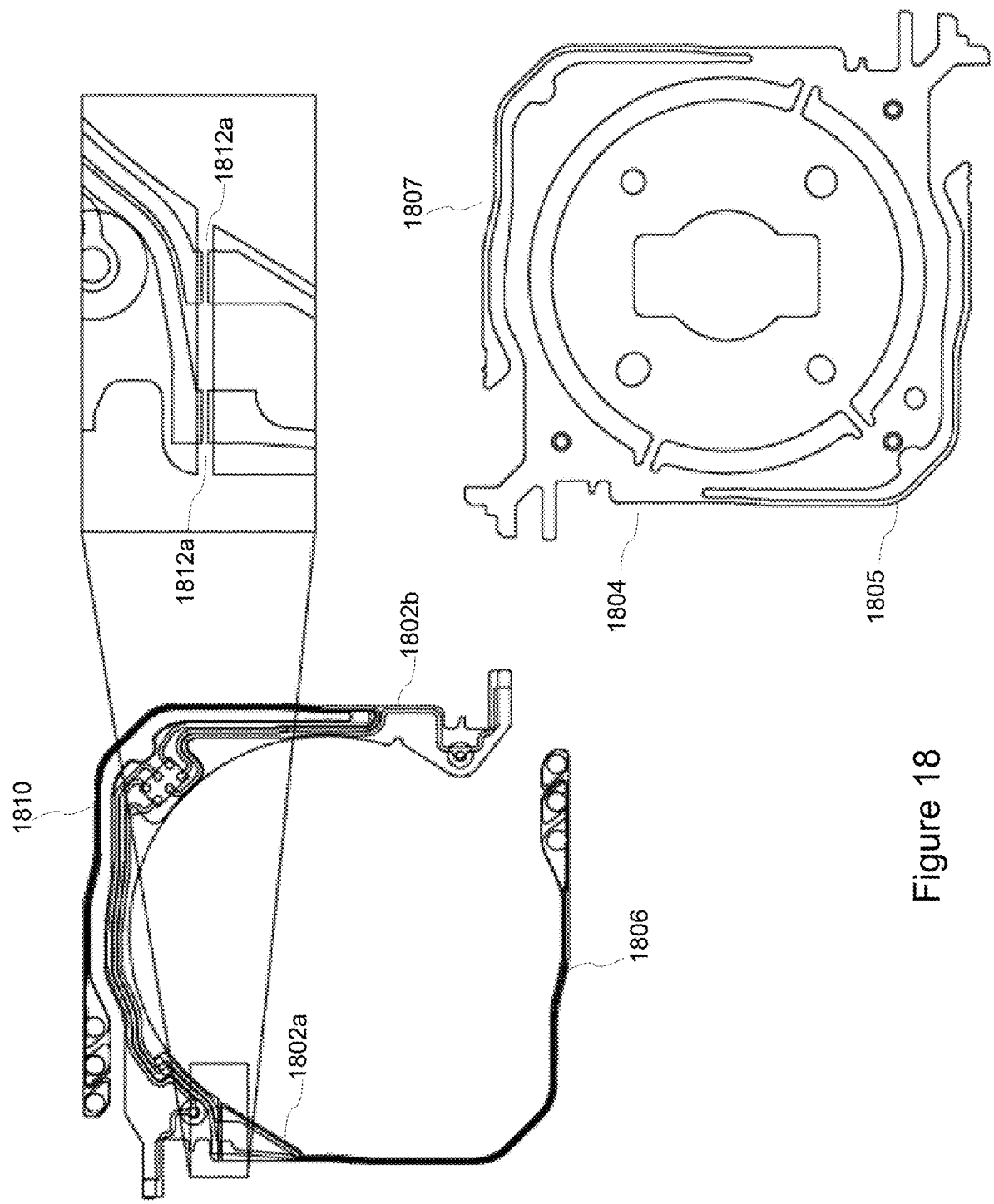
FIG. 18 illustrates circuit members in a shape relatively resembling an L-shape configured to be electrically coupled according to an embodiment.

FIG. 18 illustrates circuit members in a shape relatively resembling an L-shape configured to be electrically coupled according to an embodiment. A first circuit member 1802 is configured in a shape that relatively resembles a L-shape and configured to be disposed on portion of a moving member 1804 including a first flexure arm member 1805. The first circuit member 1802a includes a first flexure arm 1806. The first flexure 1806 is configured to be disposed on the first flexure arm member 1805 using techniques including those described herein. A second circuit member 1802b is configured in a shape that relatively resembles an L-shape. The second circuit member 1802b includes a second flexure arm 1810. The second flexure arm 1810 is configured to be disposed on another portion of a moving member 1804 including a second flexure arm 1807 using techniques including those described herein. The first and second circuit members 1802 are configured to include one or more electrical structures including, but not limited to, contact pads and one or more traces, such as those described herein. The shape of the circuit member enables manufacturing efficiencies to reduce the cost of manufacturing suspension assemblies. For example, the circuit member is formed in a shape such as the L-shape circuit members 1802 that enable nesting of individual parts during the manufacturing process reducing the area needed to manufacture one part. Thus, more circuit members are made per batch. Further, one or more traces or electrical features of the L-shape circuit members are configured to be electrically coupled with another circuit member, such as another L-shape circuit member, at one or more connectors 1812.

Figure 19:
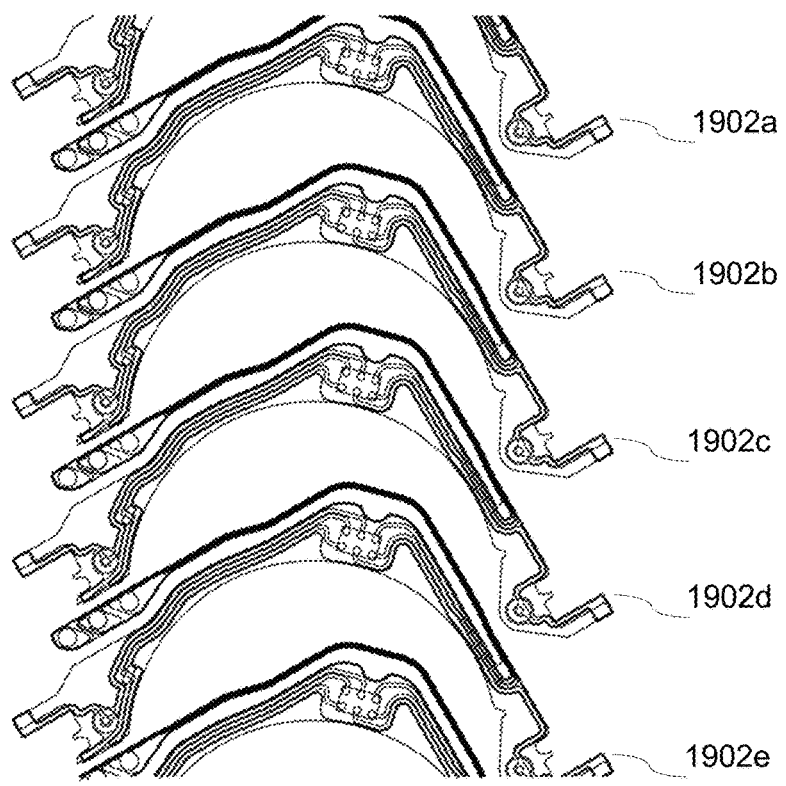
FIG. 19 illustrates an arrangement of circuit members in a shape relatively resembling an L-shape according to an embodiment.

FIG. 19 illustrates an arrangement of circuit members 1900 in a shape relatively resembling an L-shape including one or more traces or electrical features of the L-shape circuit members are configured to be electrically coupled with another circuit member, according to some embodiments, using techniques including those described herein. The shape of the circuit member enables manufacturing efficiencies to reduce the cost of manufacturing suspension assemblies. For example, the circuit member is formed in a shape such as the L-shape circuit members that enable nesting of individual parts during the manufacturing process reducing the area needed to manufacture one part. Thus, more circuit members are made per batch.

Figure 20:
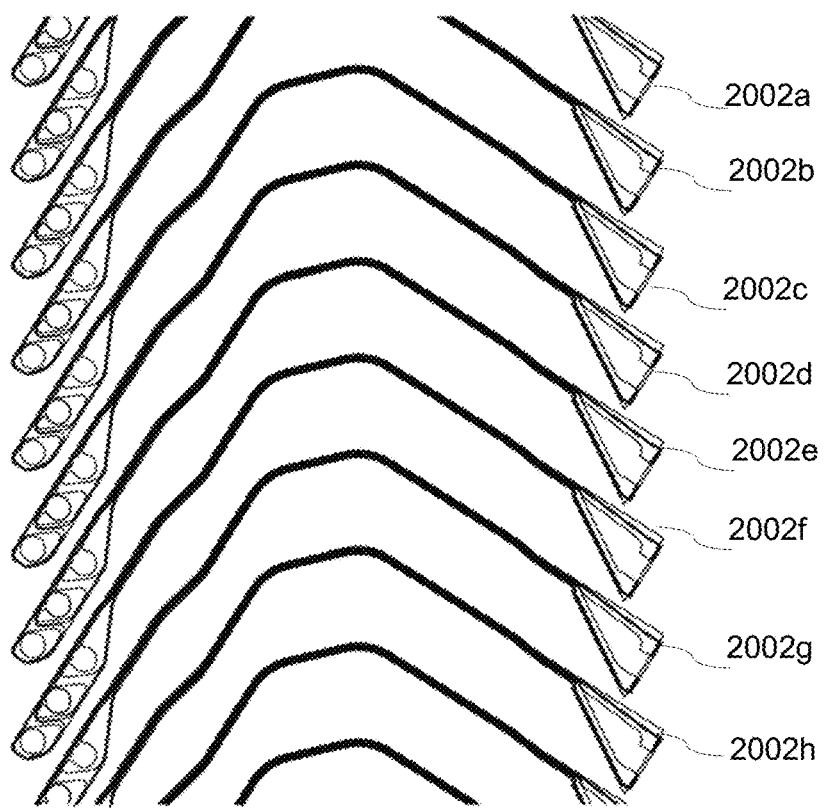
FIG. 20 illustrates an arrangement of circuit members in a shape relatively resembling an L-shape according to an embodiment.

FIG. 20 illustrates an arrangement of circuit members 2002 in a shape relatively resembling an L-shape including one or more traces or electrical features of the L-shape circuit members are configured to be electrically coupled with another circuit member, according to some embodiments, using techniques including those described herein. The shape of the circuit member enables manufacturing efficiencies to reduce the cost of manufacturing suspension assemblies. For example, the circuit member is formed in a shape such as the L-shape circuit members that enable nesting of individual parts during the manufacturing process reducing the area needed to manufacture one part. Thus, more circuit members are made per batch.

Figure 21:
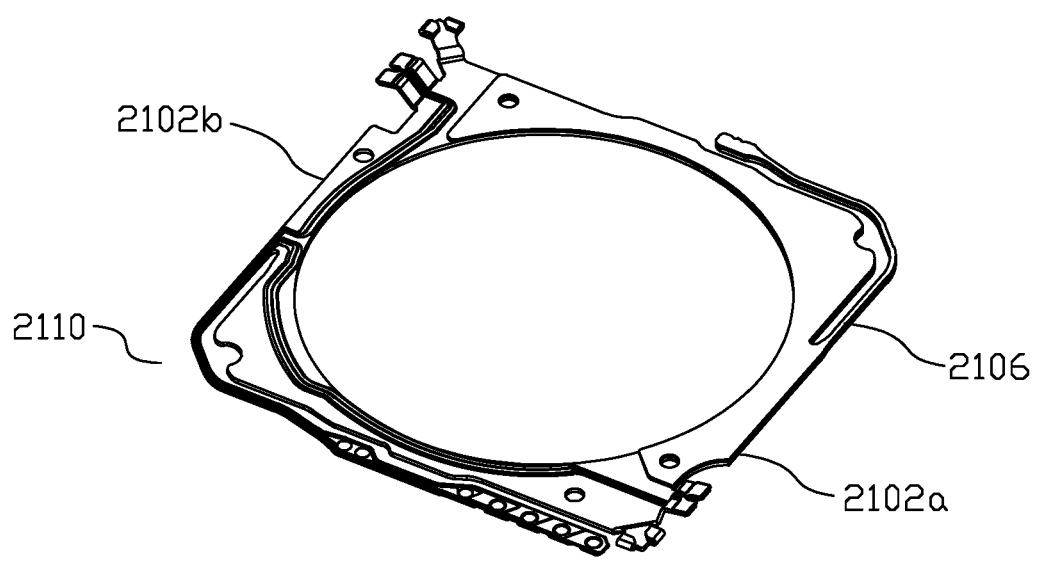
FIG. 21 illustrates a moving member including multiple pieces according to an embodiment.

FIG. 21 illustrates a moving member including multiple pieces according to an embodiment. For various embodiments, each piece 2102 of the moving member is manufactured independently from the others in a batch of similar pieces using techniques including those described herein. This increases the manufacturing efficiencies and reduced the cost of manufacturing. Some embodiments include more than two pieces. The illustrated embodiment includes a first piece 2102a and a second piece 2102b. For some embodiments, one or more piece includes a flexure are. In the illustrated embodiment, the first piece 2102a includes a first flexure arm 2106. A second piece 2102b includes a second flexure arm 2110. For some embodiments, one or more of the pieces 2102 are configured to include one or more electrical structures including, but not limited to, contact pads and one or more traces, such as those described herein. As illustrated, the first piece 2102b includes one or more electrical structures including, but not limited to, contact pads and one or more traces, such as those described herein. The second piece 2102a does not include electrical structures. For some embodiments, the one or more pieces are configured to be disposed on a chassis, such as those described herein.

Figure 22:
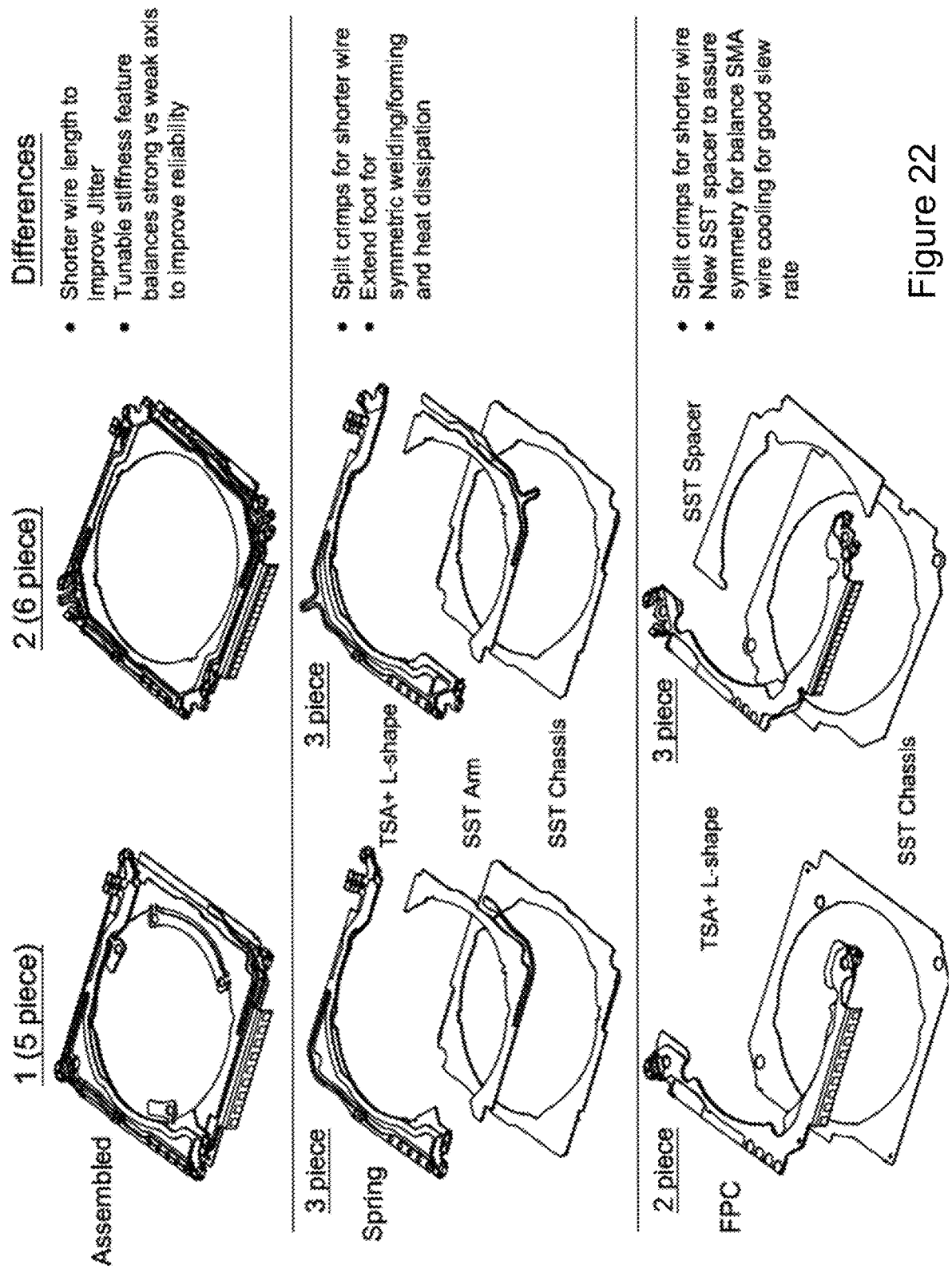
FIG. 22 illustrates various embodiments of moving members and static members including multiple pieces according to an embodiment.

FIG. 22 illustrates various embodiments of moving members and static members including multiple pieces. For various embodiments, each piece of the moving member is manufactured independently from the others in a batch of similar pieces using techniques including those described herein. This increases the manufacturing efficiencies and reduces the cost of manufacturing.

Figure 23:
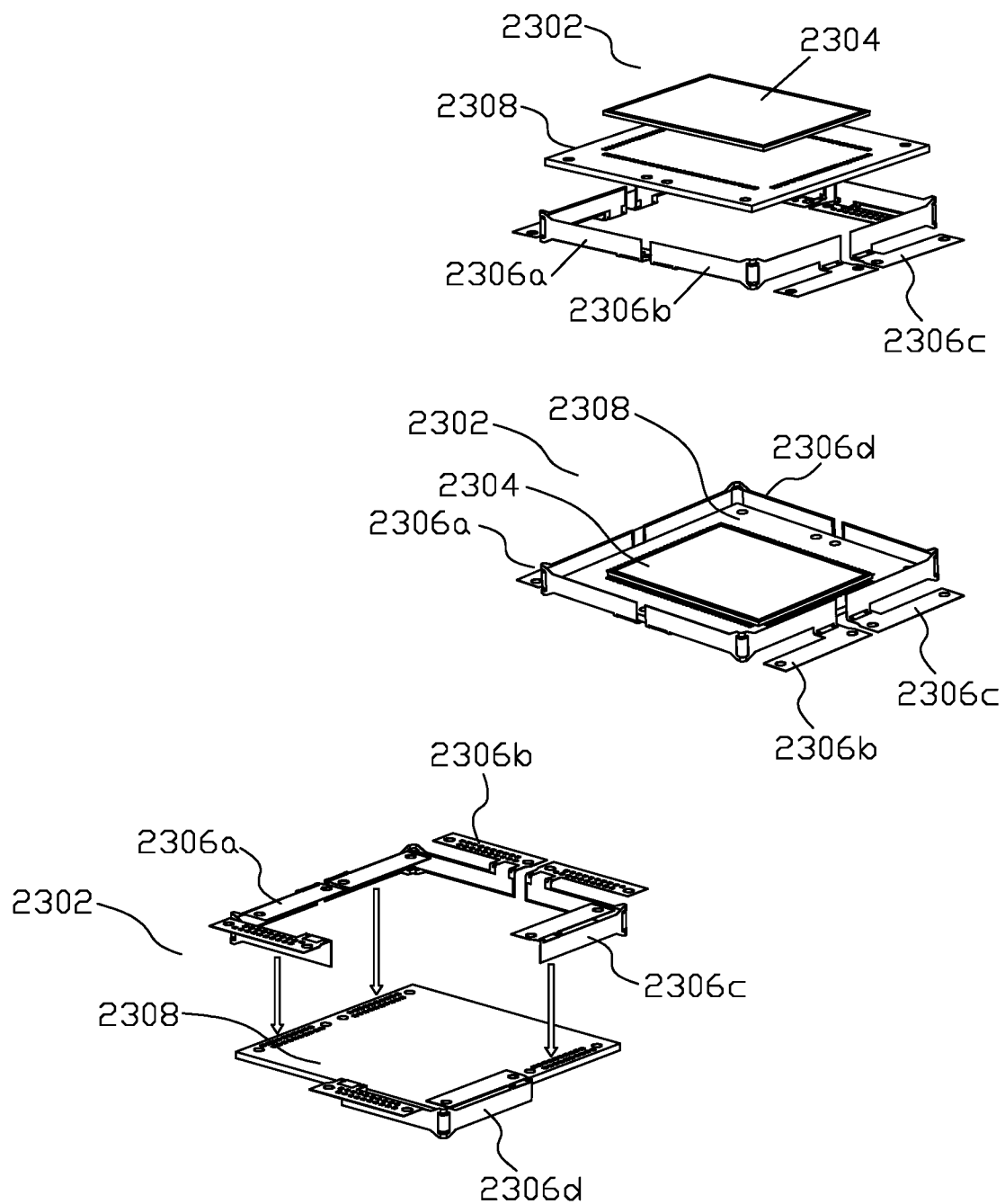
FIG. 23 illustrates multiple vies of a moving sensor circuit assembly formed of multiple members according to an embodiment.

FIG. 23 illustrates multiple vies of a moving sensor circuit assembly formed of multiple members according to an embodiment. The moving sensor circuit assembly 2302 is configured to have an image sensor 2304 disposed on an interposer circuit 2308 and to be moved as part of an OIS assembly. One or more flexible circuits 2306 are configured to include one or more traces and/or one or more other electrical structures, such as those described herein. The one or more traces are configured to electrically couple an image sensor 2304 or other electrical circuit to an electrical circuit external to the interposer circuit, for example on a printed circuit board (PCB). For some embodiments the flexible circuits 2306 are affixed to the interposer circuit 2304 using one or more of any of a weld, solder, adhesive, and other joining techniques. The flexible circuits 2306 are configured to have a low stiffness in at least one portion to enable motion in at least one direction. Each piece of the moving sensor circuit assembly 2302 is manufactured independently from the others in a batch of similar pieces using techniques including those described herein. This increases the manufacturing efficiencies and reduces the cost of manufacturing.

Figure 24:
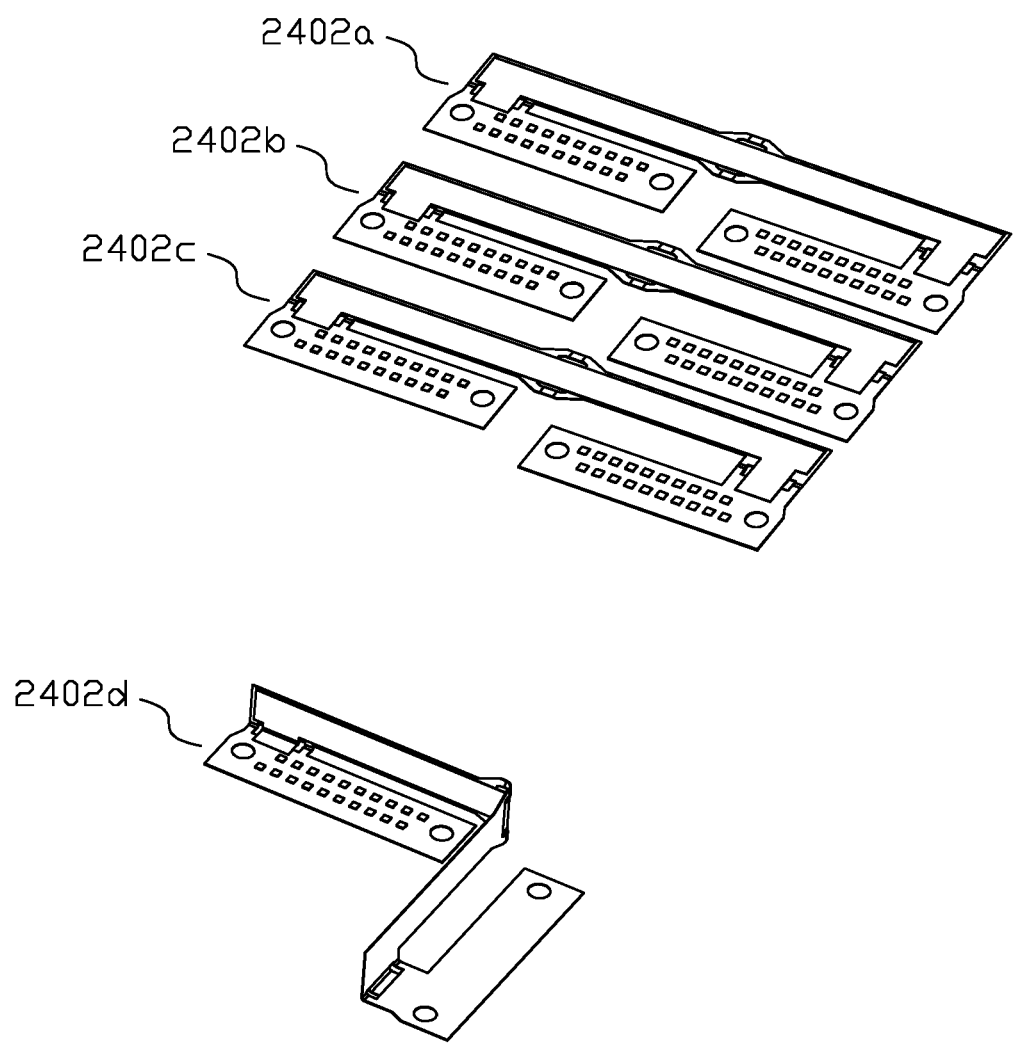
FIG. 24 illustrates flexible circuits for a moving sensor circuit according to embodiments.

FIG. 24 illustrates flexible circuits for a moving sensor circuit according to embodiments described herein. The flexible circuits 2402 are configured to be manufactured independently from the others members of the moving sensor circuit assembly in a batch using techniques including those described herein. The flexible circuits 2402 include one or more traces and/or other electrical structures, such as those described herein, and are configured to interconnect one or more circuits. The flexible circuits 2402 are configured to have low stiffness in at least a portion of the flexible circuit 2402 to enable moving in one or more directions. This increases the manufacturing efficiencies and reduced the cost of manufacturing.

Although the invention has been described with reference to different embodiments, those of skill in the art will recognize that changes can be made in form and detail without departing from the spirit and scope of the invention. Features of the different illustrated embodiments can be combined with one another. The specification and drawings are, accordingly, to be regarded in an illustrative rather than a restrictive sense.

What is claimed is:

1. A suspension assembly, comprising:
   a support member for optical image stabilization configured to receive a bearing and at least a first circuit member;
   the at least first circuit member including at least a trace disposed on a base layer, the first circuit member disposed on the support member, wherein the first circuit member includes at least a first flexure arm;
   a spring chassis configured to receive the first circuit member, the spring chassis comprising a first flexure arm member configured to support the first flexure arm; and
   a moving member configured to receive the bearing.

2. The suspension assembly of claim 1, wherein the first flexure arm includes at least one trace on the flexure arm.

3. The suspension assembly of claim 2, wherein the first flexure arm includes one or more circuit tail connections.

4. The suspension assembly of claim 3, wherein the first circuit member includes a single trace, the at least one trace is configured to electrically couple the one or more circuit tail connection to the single trace.

5. The suspension assembly of claim 4, wherein the first circuit includes a second flexure arm.

6. The suspension assembly of claim 5, wherein the second flexure arm includes at least one second trace on the second flexure arm, the second flexure arm includes one or more second circuit tail connections, the at least one second trace is configured to electrically couple the one or more second circuit tail connection to the single trace.

7. The suspension assembly of claim 1, wherein the first circuit member is disposed on a portion of the spring chassis.

8. The suspension assembly of claim 1, wherein the spring chassis includes a second flexible arm member.

9. The suspension assembly of claim 1, further comprising a second circuit member including one or more traces.

10. The suspension of claim 9, wherein at least one of the one or more traces of the second circuit member is electrically coupled to the first circuit member.

11. The suspension assembly of claim 9, wherein the second circuit member includes a second flexure arm.

12. The suspension assembly of claim 9, wherein the second circuit member is configured to be disposed on a moving chassis, the moving chassis configured to be disposed on the first circuit member.

13. The suspension assembly of claim 9, wherein the second circuit member is configured to be disposed on a portion of the support member different from the first circuit member.

14. A suspension assembly, comprising:
    a first circuit member including one or more electrical structures disposed on a base layer, the first circuit member including at least a first flexure arm;
    a moving member for optical image stabilization configured to receive at least a bearing and the first circuit member;
    a spring chassis configured to receive the first circuit member, the spring chassis comprising a first flexure arm member configured to support the first flexure arm; and
    a static member configured to receive the bearing.

15. The suspension assembly of claim 14, further comprising a second circuit member disposed on the static member.

16. The suspension assembly of claim 14, wherein the first circuit member is formed of multiple pieces.

17. The suspension assembly of claim 14, wherein the static member is formed of multiple pieces.

* * * * *